(12) United States Patent
Wolf

(10) Patent No.: US 9,637,180 B2
(45) Date of Patent: May 2, 2017

(54) FRONT-END STRUCTURE OF A MOTOR VEHICLE

(71) Applicant: Dr. Ing. h.c. F. Porsche Aktiengesellschaft, Stuttgart (DE)

(72) Inventor: Thomas Wolf, Leonberg (DE)

(73) Assignee: Dr. Ing. h.c. F. Porsche Aktiengesellschaft, Stuttgart (DE)

( * ) Notice: Subject to any disclaimer, the term of this patent is extended or adjusted under 35 U.S.C. 154(b) by 0 days.

(21) Appl. No.: 14/962,609

(22) Filed: Dec. 8, 2015

(65) Prior Publication Data

US 2016/0176450 A1   Jun. 23, 2016

(30) Foreign Application Priority Data

Dec. 17, 2014   (DE) .................... 10 2014 118 800

(51) Int. Cl.
| | |
|---|---|
| *B60K 11/04* | (2006.01) |
| *B62D 35/00* | (2006.01) |
| *B60K 11/08* | (2006.01) |
| *B62D 25/16* | (2006.01) |

(52) U.S. Cl.
CPC .............. *B62D 35/00* (2013.01); *B60K 11/04* (2013.01); *B60K 11/08* (2013.01); *B60K 11/085* (2013.01); *B62D 25/16* (2013.01)

(58) Field of Classification Search
CPC ......... B62D 35/00; B62D 25/16; B60K 11/08
USPC ...................... 180/68.1, 68.2, 68.4
See application file for complete search history.

(56) References Cited

U.S. PATENT DOCUMENTS

| | | | | |
|---|---|---|---|---|
| 4,653,788 A | * | 3/1987 | Di Giusto | B60K 11/08 188/264 A |
| 4,723,594 A | * | 2/1988 | Koehr | B60K 11/04 123/196 AB |
| 4,772,299 A | * | 9/1988 | Bogusz | B01D 45/04 188/264 AA |
| 4,805,747 A | * | 2/1989 | Moedinger | F16D 65/847 180/68.1 |

(Continued)

FOREIGN PATENT DOCUMENTS

| | | | | |
|---|---|---|---|---|
| DE | 102008022554 A1 | * | 11/2009 | ............ B60K 11/08 |
| DE | 102010037614 | | 3/2012 | |

(Continued)

OTHER PUBLICATIONS

German Search Report for German Application No. 10 2014 118 800.4 mailed Oct. 30, 2015, including partial translation.

*Primary Examiner* — Hau Phan
*Assistant Examiner* — Jacob Meyer
(74) *Attorney, Agent, or Firm* — RatnerPrestia

(57) ABSTRACT

A front-end structure of a motor vehicle, having an air inlet opening and having an air duct which extends from the air inlet opening and in which there is arranged a heat exchanger through which air can flow, wherein the air duct conducts an air flow into the wheel arch and/or laterally with respect to the wheel arch, wherein the air duct is divided, downstream of the heat exchanger, into a first duct part and a second duct part, wherein the first duct part conducts air laterally with respect to the wheel arch and the second duct part conducts air into the wheel arch, wherein an air flow control device is provided in the air duct, which air flow control device controls the air flow through the first duct part and/or through the second duct part.

10 Claims, 2 Drawing Sheets

(56) References Cited

U.S. PATENT DOCUMENTS

| | | | | |
|---|---|---|---|---|
| 4,810,021 | A * | 3/1989 | Burst | B60T 5/00 296/180.1 |
| 6,315,091 | B1 * | 11/2001 | Nilsen | F16D 65/847 188/264 A |
| 6,662,892 | B2 * | 12/2003 | Falk | B60K 11/08 180/68.1 |
| 7,059,664 | B2 * | 6/2006 | Aase | B60K 11/085 244/201 |
| 8,037,956 | B2 * | 10/2011 | Noguchi | B60K 1/04 180/65.31 |
| 8,297,685 | B2 * | 10/2012 | Wolf | B62D 35/02 296/180.1 |
| 8,474,557 | B2 * | 7/2013 | Wolf | B60T 5/00 180/68.1 |
| 8,631,889 | B2 * | 1/2014 | Begleiter | B60K 11/085 180/68.1 |
| 8,794,363 | B2 * | 8/2014 | Wolf | B60K 11/085 180/68.1 |
| 8,892,314 | B2 * | 11/2014 | Charnesky | B60K 11/085 180/68.1 |
| 9,156,331 | B2 * | 10/2015 | Murakami | B60L 1/003 |
| 9,199,674 | B2 * | 12/2015 | Wolf | B60K 11/08 |
| 2007/0023238 | A1 * | 2/2007 | Ramsay | B60T 5/00 188/71.6 |
| 2011/0308763 | A1 * | 12/2011 | Charnesky | B60H 1/3227 165/41 |
| 2012/0071075 | A1 * | 3/2012 | Wolf | B60T 5/00 454/162 |
| 2012/0318476 | A1 * | 12/2012 | Begleiter | B60K 11/085 165/51 |
| 2016/0016617 | A1 * | 1/2016 | Wolf | B62D 37/02 296/208 |

FOREIGN PATENT DOCUMENTS

| | | | |
|---|---|---|---|
| DE | 102010037615 | | 3/2012 |
| DE | 112011102498 | | 6/2013 |
| EP | 0175114 | | 3/1986 |
| EP | 0175655 | | 6/1989 |
| FR | 2858796 | | 2/2005 |
| GB | 2509933 | | 7/2014 |
| GB | 2519867 | A * | 5/2015 |
| JP | 2009269599 | A * | 11/2009 |

* cited by examiner

FRONT-END STRUCTURE OF A MOTOR VEHICLE

CROSS-REFERENCE TO RELATED APPLICATIONS

This application claims priority to German Patent Application No. DE 10 2014 118 800.4, filed Dec. 17, 2014, which is incorporated by reference herein in its entirety.

FIELD OF THE INVENTION

The invention relates to a front-end structure of a motor vehicle.

BACKGROUND OF THE INVENTION

Motor vehicles have a vehicle body with a front-end structure and a rear-end structure, said vehicle body being exposed to the air flow when the motor vehicle is in motion. Said air flow exerts air resistance on the body, which air resistance is in part also responsible for the fuel consumption of the motor vehicle. The wheels, which are typically arranged in the wheel arches and which rotate when the motor vehicle is travelling, generate air turbulence laterally with respect to the wheel arches, which turbulence increases the air resistance, which in turn has an influence on fuel consumption.

FR 2 858 796 A1, which is incorporated by reference herein, has disclosed a front-end structure of a motor vehicle having an air inlet in the bumper, from which air inlet air is conducted into the wheel arch. In this way, it is the intention to reduce the swirling of the air by the wheel arranged in the wheel arch, which is intended to reduce fuel consumption.

EP 0 175 655 B1, which is incorporated by reference herein, has disclosed a front-end structure of a motor vehicle having an air inlet in the bumper, from which air inlet air is conducted partly to the breaks in the wheel arch and also partly to a cooler for engine cooling. The distribution of air to the wheel arch and to the cooler is fixedly defined by the flow cross sections and flow resistances of the respective flow ducts through which flow passes. A design of the flow ducts which is adapted to one specific operating situation has the effect that the air distribution is not optimally configured in other operating situations.

SUMMARY OF THE INVENTION

It would be advantageous to provide a front-end structure of a motor vehicle, which front-end structure realizes an improved air distribution for the cooling and for the reduction in air resistance.

Described herein is a front-end structure of a motor vehicle, having an air inlet opening and having an air duct which extends from the air inlet opening and in which there is arranged a heat exchanger through which air can flow, wherein the air duct conducts an air flow into the wheel arch and/or laterally with respect to the wheel arch, wherein the air duct is divided, downstream of the heat exchanger, into a first duct part and a second duct part, wherein the first duct part conducts air laterally with respect to the wheel arch and the second duct part conducts air into the wheel arch, wherein an air flow control device is provided in the air duct, which air flow control device controls the air flow through the first duct part and/or through the second duct part.

An exemplary embodiment of the invention relates to a front-end structure of a motor vehicle, having an air inlet opening and having an air duct which extends from the air inlet opening and in which there is arranged a heat exchanger through which air can flow, wherein the air duct conducts an air flow into the wheel arch and/or laterally with respect to the wheel arch, wherein the air duct is divided, downstream of the heat exchanger, into a first duct part and a second duct part, wherein the first duct part conducts air laterally with respect to the wheel arch and the second duct part conducts air into the wheel arch, wherein an air flow control device is provided in the air duct, which air flow control device controls the air flow through the first duct part and/or through the second duct part. In this way, air is passed through a heat exchanger in the front-end structure of the motor vehicle, such that good cooling is generated, wherein, at the outflow side of the heat exchanger, the air is, as required, either caused to flow out laterally, in order to improve the air resistance, or conducted centrally into the wheel arch, in order to be able to also effect good cooling of the wheel or of the brakes. In this case, too, intermediate positions can advantageously be set.

In this case, it is particularly advantageous if the air flow control device is arranged in or close to the air outlet opening and controls the air flow through the first duct part and/or through the second duct part. It is thus possible for the fraction of air flowing through the respective duct part to be optimally controlled.

It is also advantageous if the air flow control device is arranged at the transition from the air duct to the first and/or to the second duct part and controls the air flow through the first duct part and/or through the second duct part. In this way, too, optimum distribution of the air can be realized.

It is particularly advantageous if the air flow control device is arranged in the first and/or in the second duct part and controls the air flow through the first duct part and/or through the second duct part. In this way, too, the distribution of the air to the duct parts can be realized in a simple manner. It is for example possible for an air flow control element to be arranged in or assigned to only one of the duct parts. In this way, the air fraction passing through said duct part can be controlled by opening or closing or by the assumption of an intermediate position. The remaining fraction then flows through the other duct part.

Here, it is also advantageous if the air flow control device has flaps or lamellae or other control elements which can be displaced, for example slid or rotated, in order to control the air flow. In this way, provision can be made of a very wide variety of air flow control devices, which are in particular of structural space-saving design.

It is thus also advantageous if control elements are arranged in the first and/or in the second duct part or upstream of the first and/or upstream of the second duct part, which control elements can be controlled jointly or independently of one another.

It is also advantageous if the first duct part opens out in the wheel arch. It is thus possible for the air to flow into the wheel arch, but to flow out thereof laterally at the edge of the wheel arch.

It is also expedient if the first duct part leads past the wheel arch. It is thus possible for the air to flow past the wheel arch outside the wheel arch.

It is also advantageous if the second duct part opens out in the wheel arch.

In this case, it is also advantageous if the first duct part opens out laterally on the body in front of the wheel arch.

Also described herein is a front-end structure of a motor vehicle, having an air inlet opening and having an air duct which extends from the air inlet opening and in which there is arranged a heat exchanger through which air can flow, wherein the air duct conducts an air flow laterally with respect to the wheel arch, wherein the air duct is, downstream of the heat exchanger, led such that the air is conducted laterally with respect to the wheel arch.

An exemplary embodiment of the invention relates to a front-end structure of a motor vehicle, having an air inlet opening and having an air duct which extends from the air inlet opening and in which there is arranged a heat exchanger through which air can flow, wherein the air duct conducts an air flow laterally with respect to the wheel arch, characterized in that the air duct is, downstream of the heat exchanger, led such that the air is conducted laterally with respect to the wheel arch.

In this case, it is particularly advantageous if the air duct opens out in the wheel arch. It is thus possible for the air to flow out at the side of the wheel arch toward the opening of the wheel arch, and to form a curtain which reduces the air resistance of the motor vehicle.

It is also advantageous if the air duct is led past the wheel arch. It is thus likewise possible for an air flow past the wheel arch to be generated, which air flow reduces the air resistance.

It is also advantageous if the first duct part opens out laterally on the body in front of the wheel arch.

Advantageous embodiments and refinements are described in the dependent claims and in the description of the figures.

BRIEF DESCRIPTION OF THE DRAWINGS

Below, the invention will be discussed in detail on the basis of an exemplary embodiment and with reference to the drawing, in which.

DETAILED DESCRIPTION OF THE INVENTION

Figure 1:
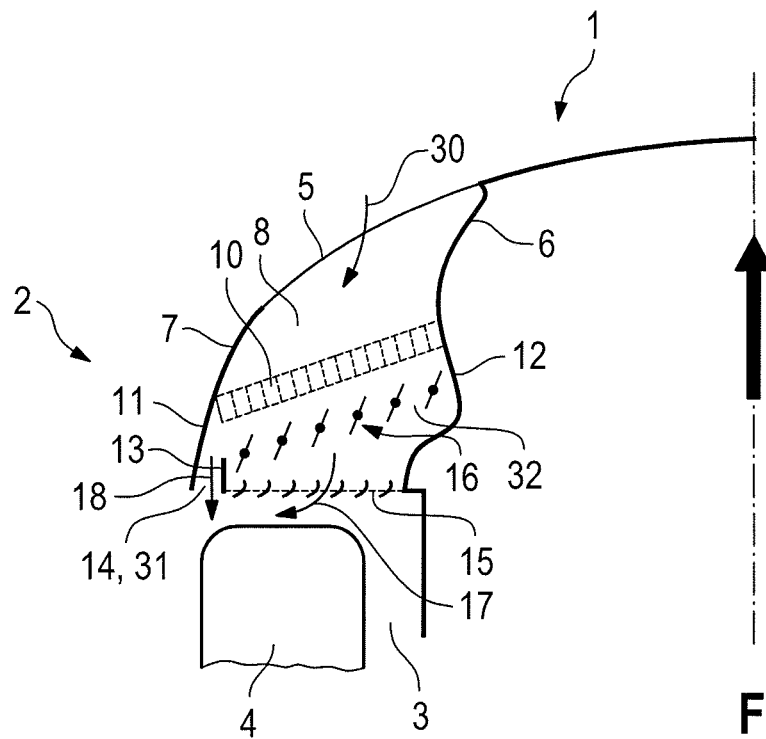
FIG. 1 is a partial and schematic sectional illustration of a front-end structure according to aspects of the invention of a motor vehicle in a first operating position.

FIG. 1 shows, in a partial view, the left-hand part of a front-end structure 1 of a motor vehicle 2 with wheel arch 3 and with a wheel 4 arranged therein.

In the front-end structure 1, there is provided an air inlet opening 5 which is arranged in particular in the bumper or elsewhere and which is delimited by an encircling wall 6 with a laterally arranged air-guiding element 7. An air duct 8 is provided so as to extend from the air inlet opening 5. The air duct 8 has a heat exchanger 10 arranged therein, through which heat exchanger the air flows, as per arrow 30. Downstream of the heat exchanger 10, the air duct 8 divides into a first duct part 31 and a second duct part 32.

The second duct part 32 leads, by way of its air outlet opening 15, into the wheel arch 3. Arranged adjacent to the second duct part is the first duct part 31, which is arranged on the outer side of the second duct part. Both the first and the second duct parts 31, 32 branch off from the air duct downstream of the heat exchanger.

The first duct part 31 opens, by way of its air outlet opening 14, into the wheel arch 3 laterally at the vehicle wall 11.

In the section shown, the second duct part 32 is delimited by two walls 12, 13, wherein the first duct part 31 is delimited by the wall 13 and the vehicle wall 11. The wall 13 thus divides the first and second duct parts 31, 32.

At the inlet of the second duct part 32 there is provided an air flow control element 16 which controls the air flow 17 through the second duct part 32 and which thus also influences the air flow 18 through the first duct part 31. If the air flow control element 16 is opened to a maximum extent, a maximum amount of air per unit of time flows through the second duct part 32. The remaining amount of air flowing into the air inlet opening 5 then flows through the first duct part 31. This is shown in FIG. 1.

Figure 2:
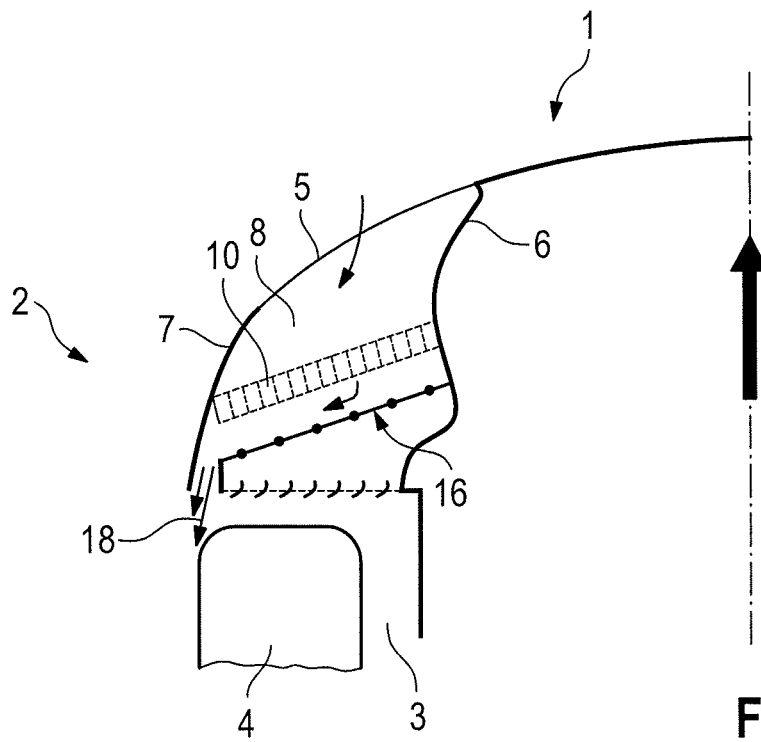
FIG. 2 is a partial and schematic sectional illustration of a further exemplary embodiment according to aspects of the invention of a motor vehicle in a second operating position.

If the air flow control element 16 is closed, a maximum amount of air flows through the first duct part 31. It is then the case that substantially no air flows through the second duct part. This is shown in FIG. 2.

If the air flow control element 16 is only partially opened, an intermediate air flow is generated in both duct parts 31, 32.

The air flow control element 16 is shown as an arrangement of rotatable flaps which are arranged adjacent to one another in the duct part 32. These may basically also be opened or closed in some other way, for example by being slid laterally or similar. It is also possible for some other air flow control element to be provided which can open or unblock the duct part in some other way.

Figure 3:
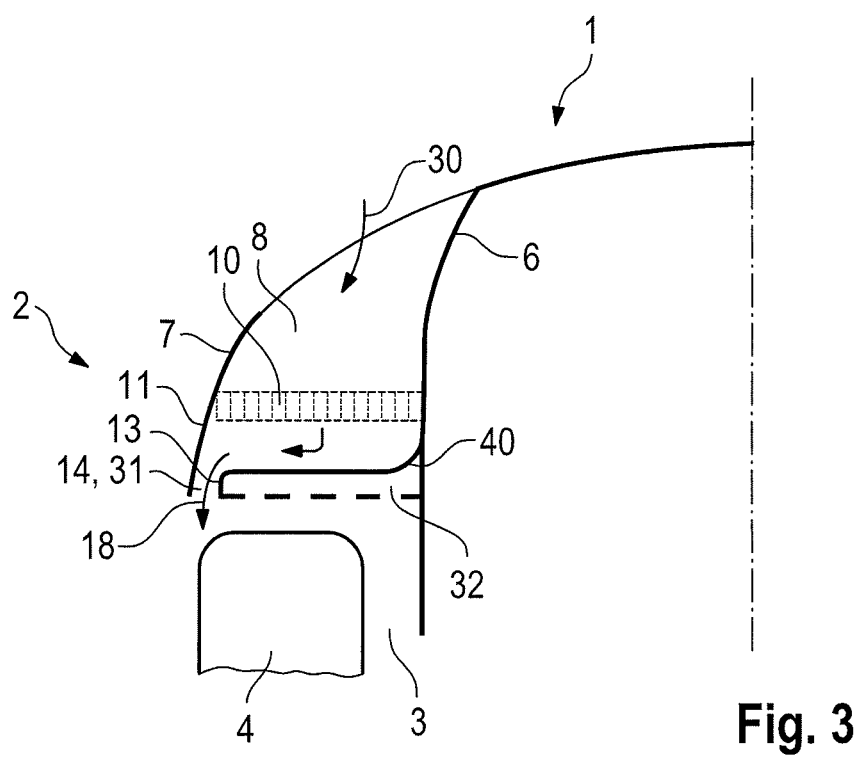
FIG. 3 is a partial and schematic sectional illustration of a further exemplary embodiment of a front-end structure according to aspects of the invention of a motor vehicle.

FIG. 3 shows a further exemplary embodiment of a front-end structure of a motor vehicle. The exemplary embodiment of FIG. 3 substantially corresponds to the exemplary embodiment of FIGS. 1 and 2, wherein a wall 40 is provided instead of the air flow control element 16. The second duct part 32 is thus substantially fully closed off, such that the air flows substantially only through the first duct part 31, in the air flow 18. The wall 40 may in this case be designed to impart a complete closing action, or may alternatively exhibit a defined throughflow by way of at least one opening or by way of openings.

What is claimed is:

1. A front-end structure of a motor vehicle, having an air inlet opening and having an air duct which extends from the air inlet opening and in which there is arranged a heat exchanger through which air can flow, wherein the air duct is configured to conduct an air flow into a wheel arch of the motor vehicle and laterally with respect to the wheel arch, wherein the air duct is divided, downstream of the heat exchanger, into a first duct part and a second duct part, wherein the first duct part includes an outlet opening that conducts air laterally with respect to the wheel arch, and the second duct part includes an outlet opening that opens out in the wheel arch and conducts air into the wheel arch, wherein the outlet opening of the first duct part is positioned closer to an exterior facing side surface of the motor vehicle at the wheel arch than the outlet opening of the second duct part, as measured in a lateral direction, wherein an air flow control device is disposed in the air duct, which air flow control device is configured to either permit or substantially prevent air flow through the second duct part.

2. The front-end structure as claimed in claim 1, wherein the air flow control device is arranged in an air outlet opening of the air duct and controls the air flow through the second duct part.

3. The front-end structure as claimed in claim 1, wherein the air flow control device is arranged at a transition from the air duct to the second duct part and controls the air flow through the second duct part.

4. The front-end structure as claimed in claim 1, wherein the air flow control device is arranged in the second duct part and controls the air flow through the second duct part.

5. The front-end structure as claimed in claim 1, wherein the air flow control device has flaps or lamellae or other control elements which can be displaced, slid or rotated, in order to control the air flow.

6. The front-end structure as claimed in claim 5, wherein control elements are arranged in said second duct part or upstream of the second duct part or are assigned to said second duct part, which control elements are configured to be controlled jointly or independently of one another.

7. The front-end structure as claimed in claim 1, wherein the first duct part extends past the wheel arch.

8. The front-end structure as claimed in claim 1, wherein the first duct part opens in front of the wheel arch.

9. The front-end structure as claimed in claim 1, wherein the air duct extends past the wheel arch.

10. The front-end structure as claimed in claim 1, wherein the first duct part is positioned adjacent the exterior facing side surface of the motor vehicle.

\* \* \* \* \*